July 21, 1970  J. P. LONGWELL  3,521,452
ROCKET NOZZLE COOLING

Filed Feb. 1, 1961  2 Sheets-Sheet 1

John P. Longwell    Inventor

By Harry Berk

Patent Attorney

United States Patent Office 3,521,452
Patented July 21, 1970

3,521,452
ROCKET NOZZLE COOLING
John P. Longwell, Westfield, N.J., assignor to Esso Research and Engineering Company, a corporation of Delaware
Filed Feb. 1, 1961, Ser. No. 86,548
Int. Cl. F02k 9/04
U.S. Cl. 60—204       5 Claims This invention relates to a system and technique of arranging a propellant grain that forms a relatively cool gas stream close to the walls of a rocket nozzle as a protection against a higher temperature gas jet from a propellant grain in the forward part of the rocket's combustion chamber. More particularly, it is concerned with the use of an amine borane grain for effective nozzle cooling in this manner.

Propellant systems of high-energy output in a rocket usually burn at very high temperatures and form hot gases which cause severe erosion and corrosion of even the best nozzle materials. Hot gases from high-temperature propellants may include corrosive compounds, such as HCl, HF or BF.

Investigations on which the present invention is based show that effective nozzle wall cooling and protection against erosion and corrosion is achieved by placing an amine borane grain of relatively smaller size than the main propellant grain, closer to the nozzle end of the rocket or reaction motor and in such a manner as to delay mixing of the cooling gas with hotter gas to a point well past the nozzle throat.

Amine boranes may be of various monomeric, isomeric and polymeric forms, and a preferred form is hydrazine bis-borane, $N_2H_4 \cdot 2BH_3$, which is converted by heat into hydrazino bis-borane $[(N_2H_2)(BH_2)_2]_n$. Hydrazine boranes and other amine boranes, particularly hydrazine bisborane, have been found particularly suitable for the arrangement as nozzle coolants. They exert a high impulse and generate a large volume of relatively cool gas. With a proper arrangement, the specific impulse is as good as or better than that obtained in the absence of hydrazine boranes.

The desired effective cooling is obtained by an arrangement of a solid amine borane grain which generates gas at a proper rate and makes this gas flow as a relatively cool stream directly into contact with the nozzle surfaces where excessive heat is a critical problem.

Preferred arrangements of hot burning solid propellant grain toward the head of a rocket with the hydrazine borane grain located near the nozzle are shown diagrammatically in the drawing.

Figure 4:
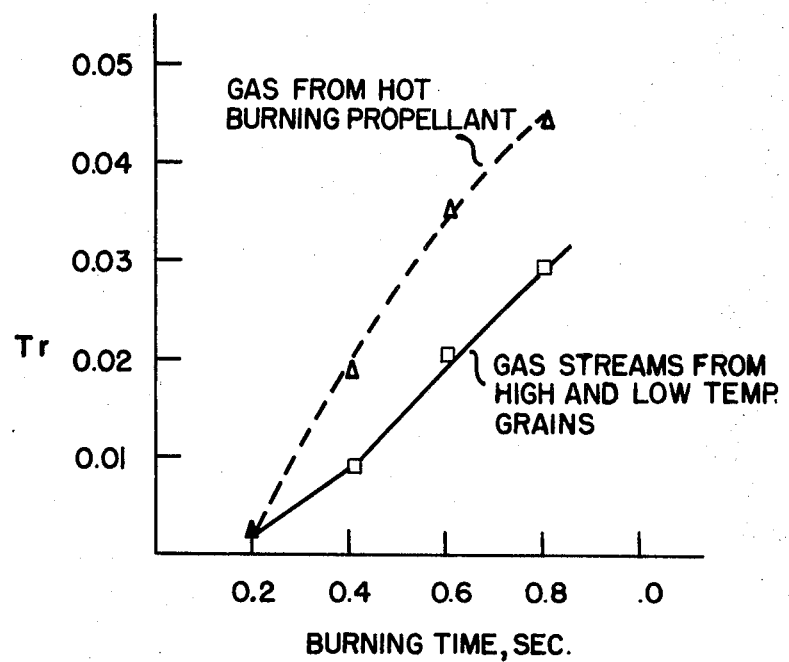

FIG. 4 graphically shows data on nozzle cooling effected by a hydrazine bis-borane grain close to the nozzle.

Figure 1:
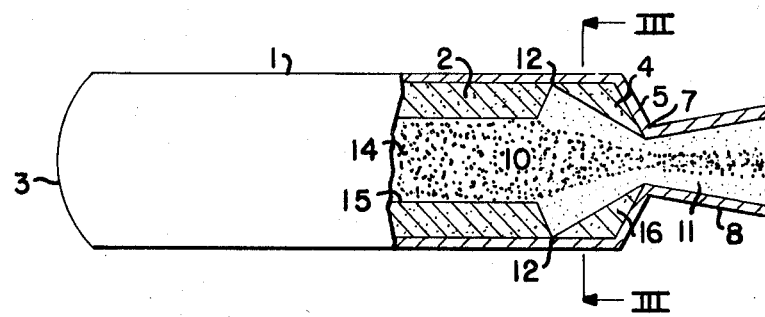
FIG. 1 shows a longitudinal cross-section of a loaded rocket motor having a short exhaust nozzle and with a hollow conical grain of hydrazine borane close to the nozzle throat.

In FIG. 1, the cylindrical rocket casing 1 contains a hollow cylindrical grain 2 of high-temperature propellant extending forward toward the head or nose end 3, and a smaller hollow grain 4 of hydrazine borane shaped conically to coincide with the shape of the converging nozzle wall 5. The nozzle has a convergent section wall 5, throat 7, and divergent section wall 8. The convergent wall 5 of the short nozzle makes an angle greater than 30° with the axis 6 of the rocket motor. The nozzle has a bolted or threaded engagement with the exhaust end of the casing 1. For testing purposes, thermocouple wells are provided at spaced points in the nozzle wall.

Figure 2:
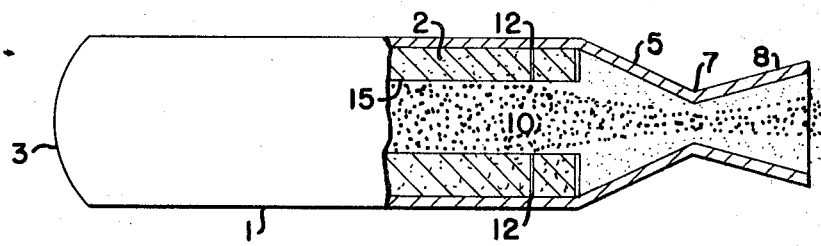
FIG. 2 shows a longitudinal cross-section of a loaded rocket motor having a conventional convergent-divergent nozzle with the hydrazine borane in the form of a hollow cylindrical grain at the exhaust gas entrance into the nozzle.
Figure 3:
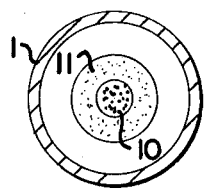
FIG. 3 shows a lateral cross-section view taken along lines 3—3 of FIG. 1.

In FIG. 2 the nozzle is similarly attached to casing 1 containing a hollow cylindrical grain 2 of high-temperature propellant. The nozzle is of more conventional shape, being more elongated and having its convergent wall 5 make an angle of less than 30° with the axis. The amine borane grain 4 is of hollow conical shape that does not essentially extend into the nozzle, although it may be thus extended. In other respects, the loaded rocket of FIG. 2 is similar to that of FIG. 1.

In FIGS. 1 and 2, the flow path of the higher temperature gas is indicated by heavier shading 10, and the cooler gas flow path is indicated by the lighter shading 11.

In the grain assembly, a thin coating of plastic material or a thin metal may be used as a separator 12 between the grains to avoid burning at the interface and prevent reaction of incompatible materials.

Hydrazine bis-borane (HBB) is the preferred cooling propellant of the $H_2$ and BN forming type, because it has a high Isp of 284 and supplies a large volume of such exhaust gas products. However, other substances of this type can be used in a similar manner, such as hydrazinobis-borane, hydrazine mono-borane, and mixtures of such compounds referred to herein as amine boranes.

The existing high-temperature propellants may be formulated in many ways to include, for example, materials such as nitrocellulose, nitroglycerine, ammonium perchlorate, and aluminum powder. Higher temperature new propellants may be formulated to include, for example, $NF_2$ oxidizers, e.g. tetrakis $NF_2$ butane, B, Li, Be, and Mg metals. There are formulations that include amine boranes with oxidizers and metal fuels and which burn at high-temperature to give high thrust. The exhaust may include solid and liquid particles as well as gaseous particles but it is herein referred to as gas.

In operation of a rocket, as in FIG. 1 and FIG. 2, for expulsion of a hot gas jet surrounded by cooler gases, the hot gas is generated in the perforation 14 of the main propellant grain 2 burning at its surfaces 15. Surface 15 serves as a duct to make the hot gas flow toward the nozzle. As the hot gas or working fluid flows from 14 past the cooler propellant grain 4, i.e. through perforation 16 of grain 4, the hot gas is constrained into a central jet surrounded by cooler gas from the burning surface 17 of grain 4. The cooler gas stream from the amine borane grain 4 is contrived to have an annular form surrounding the constricted jet of hot gas generated by the hotter burning propellant grain 2. Grain 4 can be of the end and central surface burning type as in FIG. 2.

In the simplified rocket motor assembly, the main solid propellant grain 2, which is in the forward part of the rocket case and which forms the relatively hot gas jet 10, is shown to have a tubular shape, i.e. with a cylindrical surface adjacent the cylindrical inner wall of the rocket case and with its axial perforation bounded by an inner cylindrical surface of the grain where burning takes place. The thus bounded perforation 14 is the duct or hot gas jet flowing toward the nozzle. This duct is coaxially in alignment with the duct or perforation 16 bounded by the inner surface of the cooler burning grain 4 which forms the cooler gas stream surrounding the hot gas jet as it enters the nozzle. However, the geometrical shapes of the grains can be varied to change the relative burning rates as by varying the surface area exposed for burning, and still be arranged as set forth to have the hot gas jet surrounded by the coler gas stream on entering the nozzle for protection of the nozzle. For example, the perforation may have a star- or gear-shape. Combined advantages of both types of propellants are obtained from this arrangement, i.e. nozzle cooling protection by a film of relatively cool gas and insulating action of solid BN together with high impulse from the high-temperature propellant. In the burning the amine boranes to hydrogen and BN, the BN product has been found to form a film which acts as an insulating protection.

Experiments were carried out to determine the feasibility of cooling and protecting nozzles by a layer of relatively cool gases from the burning of a hydrazine bisborane (HBB) grain backing up a propellant grain of conventional propellant in a rocket motor as illustrated in FIG. 1 and FIG. 2. As a conventional type, hot-burning grain of mixed fuel and oxidizer, an aluminized composite double base (nitroglycerin and nitrocellulose) propellant containing 19% Al and ammonium perchlorate oxidizer was used. This relatively high-temperature or hot burning propellant burned at a rate similar to that of the HBB thereby simplifying the problem of grain geometry in experiments. Comparative burning data are shown as follows:

TABLE I.—BURNING DATA

| Propellant | Burning rate at 1,000 p.s.i., in./sec. | Pressure Exponent | Combustion temperature at 1,000 p.s.i., ° C. |
| --- | --- | --- | --- |
| HBB | 0.70 | 0.56 | 1,540 |
| Hot burning | 0.71 | 0.50 | 3,730 |

Using the arrangement shown in FIG. 2, data was obtained on nozzle temperatures at various locations to determine the cooling effect. Of the total propellant in the rocket motor, the HBB grain was 12% by weight and the hot burning grain 88% by weight. The data were comparted by plotting reduced temperature $T_r$ vs. burning time.

$$T_t = \frac{t - t_o}{t_g - t_o}$$

where $t$=observed temperature in the motor wall 1/16 inch from the inner surface, $t_o$=ambient temperature and $t_g$=combustion temperature of the mixed gases (e.g. completely mixed gases from 12% HBB and 88% of the hot burning propellant). In graphs of the reduced temperature plotted against burning time, the data points fall on the same line if the heat transfer coefficient is the same. In FIG. 4, a lower reduced temperature is evidenced in the curve I plotted for $T_r$ points of the arranged two grains (hot burning and HBB) than in the $T_r$ curve II for the single hot burning grain.

In experiments using a shortened nozzle as in FIG. 1, the cooling effect was considerably greater. The cooling effect for the short nozzle is continued well past the throat into the divergent section. This cooling is further improved by inserting the amine borane grain into the convergent section as shown in FIG. 1 making the amine grain shaped with the convergent section wall for smoother flow of the gas.

In small motors, satisfactory experiments can be run using only the compresed cohesive strength of the straight amine borane. For larger motor firings or practical rockets, a binder, usually a polymeric material, is useful to furnish strength, elasticity and toughness. A polymeric coating material may also be used as protection again moisture absorption. Several good binders compatible with the amine boranes have been developed e.g. epoxy resins.

Further study showed that an improved protection of the nozzle, particularly at the throat, i.e. narrowest passage, should be obtained by preventing mixing of the gases, i.e. mixing of the relatively cool $H_2$ and BN gases from the HBB with higher temperature gases from the hot-burning propellant, until the gases have passed through the nozzle throat.

What is claimed is:
1. A rocket motor propellant assembly comprising a hot-burning solid propellant grain adjacent to a solid propellant grain of an amine borane that burns to form a relatively cooler stream of hydrogen and BN.
2. A rocket motor propellant system comprising in combination a bipropellant grain of fuel and of oxidizer that burns to form a hot gas jet and an adjacent propellant grain of hydrazine bisborane that burns to form a lower temperature gas stream of hydrogen and BN surrounding the hot gas jet.
3. Method of protecting a rocket exhaust nozzle, which comprises moving high-temperature propellant working fluid as a jet toward the nozzle and surrounding said jet by lower temperature propellant working fluid which contains hydrogen and BN particles as said jet approaches the throat of the nozzle.
4. A rocket motor assembly comprising a rocket case having a forward closed end that receives reaction thrust and a rear nozzle for exhausting gas streams generated inside the rocket case, a solid bipropellant grain containing a powdered aluminum as fuel and an oxidizer positioned forward in the case from the nozzle to produce a hot gas jet to be exhausted through said nozzle, a solid monopropellant grain of amine borane that burns to form a relatively cooler annular stream of hydrogen and borane nitride particles surrounding the hot gas jet as it flows into the throat of the nozzle, said monopropellant grain of amine borane being positioned closer to the nozzle than the solid bipropellant grain and having an axial perforation in alignment with an axial perforation of said solid bipropellant grain and with the nozzle throat so that the hot gas jet flows in a constricting path through the axial perforation of the solid monopropellant grain surrounded by the annular stream of cooler gas from the solid monopropellant grain as the hot gas jet flows through the throat of the nozzle.
5. Method of protecting a rocket exhaust nozzle having a convergent section leading from the inside of the rocket to a narrower throat passage through which gas generated in the rocket flows into a divergent section of the nozzle which comprises arranging a solid propellant grain of an amine borane that burns to form an annular stream of hydrogen gas and BN particles in the convergent section of the nozzle so that this annular stream is in direct contact with the nozzle surfaces and forms a film of BN as an insulating protection thereon.

References Cited

UNITED STATES PATENTS

| 1,187,779 | 6/1916 | Patten | 102—98 |
| 2,444,957 | 7/1948 | Skinner | 60—35.6 |
| 2,627,160 | 2/1953 | MacDonald | 60—35.6 |
| 2,779,281 | 1/1957 | Maurice et al. | 60—39.47 |
| 3,046,829 | 7/1962 | Roemer | 102—98 |
| 3,048,966 | 8/1962 | Fergud et al. | 60—35.4 |
| 3,054,258 | 9/1962 | Marti | 60—35.6 |
| 3,088,273 | 5/1963 | Adelman et al. | 60—35.6 |
| 3,091,924 | 6/1963 | Wilder | 60—35.54 |
| 3,092,963 | 6/1963 | Lawrence | 60—35.54 |
| 3,115,746 | 12/1963 | Hsia | 60—35.6 |
| 3,138,602 | 6/1964 | Szymanski et al. | 149—22 X |

FOREIGN PATENTS 1,003,758  11/1951  France.

VERLIN R. PENDEGRASS, Primary Examiner

U.S. Cl. X.R.

60—253